Aug. 31, 1926.
G. L. LUCK
1,598,292
ROD COUPLING
Filed Jan. 19, 1925
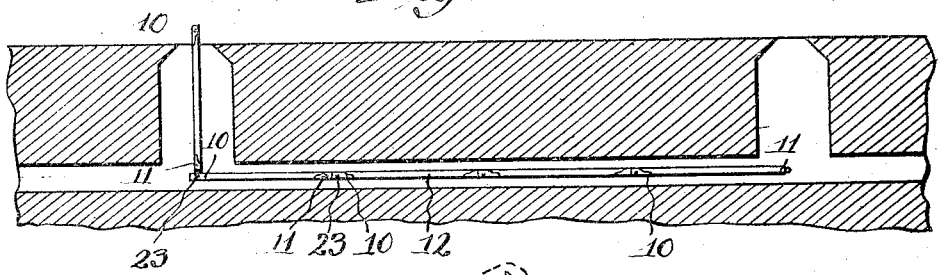
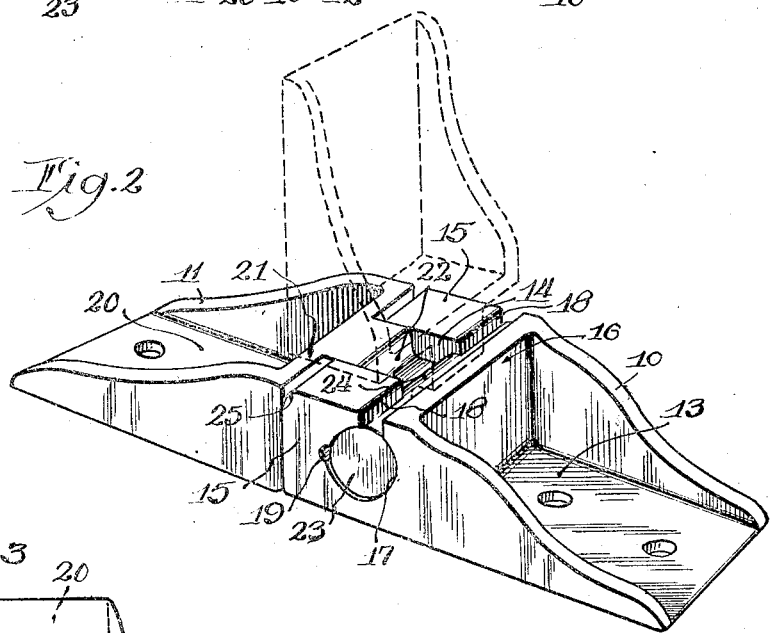
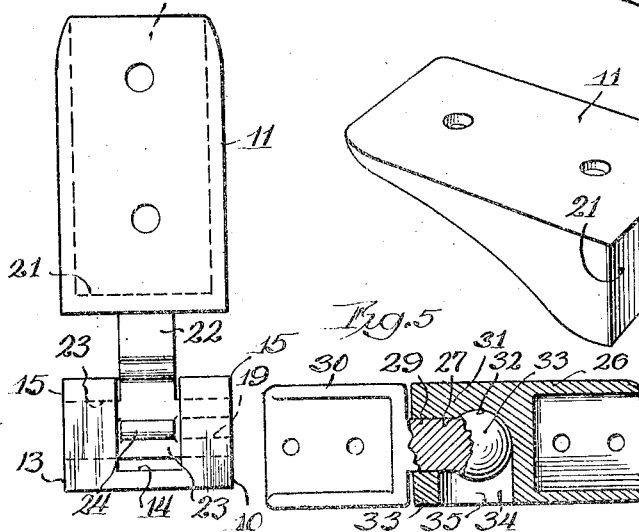
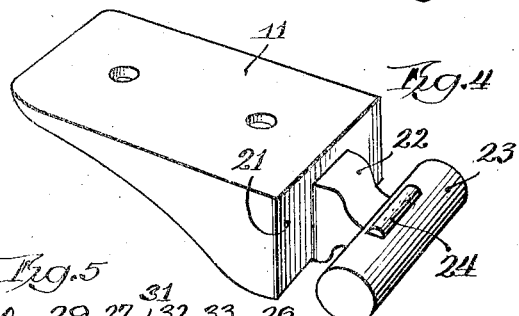
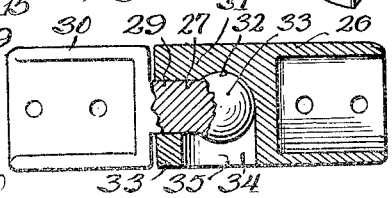
Inventor,
George L. Luck, Patented Aug. 31, 1926.

1,598,292

UNITED STATES PATENT OFFICE.

GEORGE L. LUCK, OF EVANSTON, ILLINOIS.

ROD COUPLING.

Application filed January 19, 1925. Serial No. 3,253.

This invention relates to improvements in rod couplings particularly adapted for connecting together rod sections for use in conduits and by means of which rods a cable or conductor may be threaded through the conduit, and one of the objects of the invention is to provide an improved coupling of this character by means of which the rod sections may be easily and quickly coupled together and uncoupled, but only when adjacent rod sections are held at a predetermined angle with respect to each other, the coupling members being so constructed that portions thereof will form abutments to facilitate the coupled sections being threaded through a conduit.

A further object is to provide an improved coupling of this character for coupling rod sections, each of the rod sections being provided with a coupling member at each end thereof adapted to engage a coupling member on the proximate end of adjacent sections, the coupling members being provided with means necessitating the positioning of the rod sections in a predetermined manner before the coupling members can be connected.

To the attainment of these ends and the accomplishment of other new and useful objects as will appear, the invention consists in the features of novelty in substantially the construction and in the combination and arrangement of the several parts hereinafter more fully described and claimed and as shown in the accompanying drawing illustrating the invention, and in which:—

Figure 1, is a view of a portion of a conduit showing several rod sections connected together and the manner of use thereof.

Figure 2, is a detail perspective view of a pair of coupling members showing in dotted lines the necessary relative position of the members to couple or uncouple them.

Figure 3, is an end elevation of the coupling members when in position to be uncoupled.

Figure 4, is a detail perspective view of the back or bottom face of one of the coupling members.

Figure 5, is a plan view partly in elevation and partly in horizontal section of a modified form of the invention.

Referring more particularly to the drawing the numerals 10—11 designate the coupling members one of which is secured to the opposite ends of each of the rod sections 12.

The member 10 comprises a body portion preferably having a socket 13 opening through one end thereof and into which socket one end of the rod section is inserted and the coupling member is fastened to the rod in any suitable manner.

The member 10 extends for a considerable distance beyond the socket and the extremity of such extension is bifurcated as at 14 to form spaced walls 15, the top of the walls being preferably substantially flush with the top of the wall 16 of the socket 13.

A transverse opening 17 forming a seat extends through the walls 15 to intersect the bifurcation 14 and opens through the top of the walls 15 as at 18 just beyond the wall 16 of the socket 13. The width of the opening 18 is considerably less than the greatest diameter of the opening 17 and the latter is so disposed that a portion thereof extends into the adjacent faces of the walls 15 and the wall 16.

A groove 19 extends through one of the walls 15 transversely with respect to the bifurcation 14 and parallel with the opening 17 and has communication with the latter.

The coupling member 11 is also preferably provided with an open socket 20 having an end wall 21 and projecting beyond the wall 21 is a shank 22 provided with a head 23 projecting beyond the sides of the shank and preferably of a cylindrical configuration to form a pivot member of a shape to conform to and fit within the opening 17 to pivotally connect the coupling members 10—11.

The shank 22 is of a size and configuration to fit within the bifurcation 14 when the head is seated in the opening or seat 17 and when the members are moved into the position as shown in full lines in Figure 2, a portion of the lower face of the shank will engage and rest upon the bottom wall of the bifurcation and the proximate faces of the coupling members will abut so as to facilitate the coupled sections being pushed through a conduit.

Carried by the head 23 is a rib or projection 24 so arranged that when the coupling members are held at a predetermined angle with respect to each other, the head 23 may be slipped into the opening 17 through one end thereof and the rib will enter the groove or recess 19 thereby permitting the members to be coupled. The rib is also so located upon the head 23 and is of such a length that when the coupling members are pivotally moved in a direction transverse thereof and from the dotted to the full line position in Figure 2, the rib or projection 24 will enter the bifurcation 14 to stand between the walls 15 as shown clearly in Figure 3. The groove is provided in only one of the walls 15 and the lugs 24 co-operates with the groove to insure that the coupling members are not only in a proper angular position with respect to each other for coupling and uncoupling, but also serves as a means to prevent the members from being coupled upsidedown one with respect to the other. During the coupling operation one end of this rib or projection will engage the face of the wall in which there is no groove and thereby arrest the lateral movement of the coupling members one with relation to the other and thereby serve as a guide or indicator for the proper positioning of the coupling members so that the shank 22 will enter the bifurcation 14 when the coupling members are pivotally moved with respect to each other in one direction.

With this improved construction it will be apparent that it is not only necessary to hold the coupling members at a predetermined angle one with respect to the other before they can be coupled or uncoupled, but the construction insures that the rod sections must be coupled in the proper manner with the proper side uppermost.

If necessary a portion of one of the abutting faces of the members may be rounded as at 25 so as not to interfere with the free pivotal movement of the members one with relation to the other. The head 23 of the shank 22 also forms an extended bearing against the adjacent coupling member and co-operates therewith to assist in maintaining the coupling members against relative rocking movements in directions transverse to the direction of pivotal movement of the members.

In Figure 5, there is shown a modified form of the invention and in which form the coupling member 26 is provided with a bifurcated extremity 27 of a shape to receive the ball shaped extremity 28 on the end of the shank 29 projecting beyond the end of the coupling member 30. The wall 31 of the bifurcation is provided with a socket or seat 32 opening into the bifurcation and the wall 33 is provided with an opening 34 therethrough having a restricted opening formed by a portion of the wall 33 of the bifurcation overhanging the opening 34 and as indicated by the dotted line 35 in Figure 5, to form a restricted opening through the top of the wall 33.

These members are coupled and uncoupled in the same manner as with the form of the invention shown in Figure 2, that is, the members are held at a predetermined angle with respect to each other and the ball 28 is passed into the opening 34 until it engages the wall 31 and rests in the seat 32. At this time the shank 29 will then be in a position to enter the bifurcation 27 when the coupling members are pivotally moved with respect to each other or flattened out to the position shown in Figure 5.

With this improved coupling it will be manifest that the parts will not only be firmly secured together, but they will be held against accidental disengagement and furthermore it will not be possible to couple the rod sections together until the proper ends of adjacent rods or sections are brought together.

While the preferred forms of the invention have been herein shown and described it is to be understood that various changes may be made in the details of construction and in the combination and arrangement of several parts, within the scope of the claims, without departing from the spirit of this invention.

What is claimed as new is:—

1. In combination a plurality of rod sections adapted to be arranged end to end, the proximate ends of adjacent sections being adapted to be connected to form a coupling, said coupling embodying two co-operating members, one member being secured to each of the rod sections, the extremity of one of the members being bifurcated, a headed shank projecting from the other member, the said members having formations whereby two rod sections may be joined only by connecting said members by a transverse relative movement, and means operating to prevent coupling of the rod sections until the corresponding areas of the adjacent sections are faced in the same direction.

2. In combination a plurality of rod sections adapted to be arranged end to end, the proximate ends of adjacent sections being adapted to be connected to form a coupling, said coupling embodying two co-operating members, one member being secured to each of the rod sections, the extremity of one of the members being bifurcated and having an opening forming a seat transversely intersecting said bifurcation, said opening being provided with a lateral slot opening through the face of the member and also communicating with the bifurcation, a shank projecting from the other member, a laterally projecting head on the shank whereby two rod sections may be joined by connecting said members by a transverse relative movement, the said rod sections and members when coupled being adapted to be relatively moved in a direction transverse to the direction of coupling movement to cause the shank to enter and stand within the said bifurcation, and means necessitating a predetermined initial relative positioning of the coupling members to permit coupling or uncoupling thereof.

3. In combination a plurality of rod sections adapted to be arranged end to end, the proximate ends of adjacent sections being adapted to be connected to form a coupling, said coupling embodying two co-operating members, one member being secured to each of the rod sections, the extremity of one of the members being bifurcated and having an opening forming a seat transversely intersecting said bifurcation, said opening being provided with a lateral slot opening through the face of the member and also communicating with the bifurcation, a shank projecting from the other member, a laterally projecting head on the shank, whereby two rod sections may be joined by connecting said members by a transverse relative movement, the said rod sections and members when coupled being adapted to be relatively moved in a direction transverse to the direction of coupling movement to cause the shank to enter and stand within the said bifurcation, and means necessitating a predetermined initial relative positioning of the rod sections and coupling members to permit coupling or uncoupling thereof, the said means embodying a groove or slot in one of the members and a lug on the other member adapted to enter the slot.

4. In combination a plurality of rod sections adapted to be arranged end to end, the proximate ends of adjacent sections being adapted to be connected to form a coupling, said coupling embodying two co-operating members, one member being secured to each of the rod sections, the extremity of one of the members being bifurcated and having an opening forming a seat transversely intersecting said bifurcation, said opening being provided with a lateral slot opening through the face of the member and also communicating with the bifurcation, a shank projecting from the other member, a laterally projecting head on the shank, whereby two rod sections may be joined by connecting said members by a transverse relative movement, the said rod sections and members when coupled being adapted to be relatively moved in a direction transverse to the direction of coupling movement to cause the shank to enter and stand within the said bifurcation, one of the walls of the bifurcation having a slot extending therethrough to the bifurcation, and a lug on the said head adapted to pass through the said slot into the bifurcation to move in said bifurcation and stand between the walls of the bifurcation, the said shank adapted to engage the bottom of the bifurcation to limit the relative movement of the members in one direction.

5. In combination a plurality of rod sections adapted to be arranged end to end, the proximate ends of adjacent sections being adapted to be connected to form a coupling, said coupling embodying two co-operating members, one member being secured to each of the rod sections, the extremity of one of the members being bifurcated and having an opening forming a seat transversely intersecting said bifurcation, said opening being provided with a lateral slot opening through the face of the member and also communicating with the bifurcation, a shank projecting from the other member, and a laterally projecting head on the shank whereby two rod sections may be joined by connecting said members by a transverse relative movement, the said rod sections and members when coupled being adapted to be relatively moved in a direction transverse to the direction of coupling movement to cause the shank to enter and stand within the said bifurcation, a portion of the said opening being irregular in cross section and a portion of the said head being of a configuration to conform to the said irregular portion of the said opening whereby the said rod sections and members must be held in a predetermined position with respect to each other before they can be coupled.

In testimony whereof I have signed my name to this specification, on this 10th day of January, A. D. 1925.

GEORGE L. LUCK.